March 8, 1938.  A. L. BALL ET AL  2,110,143

METHOD OF MAKING COMPOSITE ABRASIVE ARTICLES

Filed March 23, 1935

INVENTOR.
ALBERT L. BALL
ARTHUR G. SCUTT
BY
ATTORNEY.

Patented Mar. 8, 1938

2,110,143

UNITED STATES PATENT OFFICE 2,110,143

METHOD OF MAKING COMPOSITE ABRASIVE ARTICLES

Albert L. Ball, Lewiston, and Arthur G. Scutt, Niagara Falls, N. Y., assignors, by mesne assignments, to The Carborundum Company, Niagara Falls, N. Y., a corporation of Delaware Application March 23, 1935, Serial No. 12,578

4 Claims. (Cl. 51—278)

This invention relates to the manufacture of composite abrasive articles, and more particularly to the manufacture of abrasive wheels having an outer layer or layers of abrasive mix mounted on a core or support.

A peculiar problem is faced in attempting to provide on the periphery of an abrasive article a layer similar to a tire which may be used for abrading, polishing and the like. The cost of the abrasive grain in the peripheral layer may be so high as to require that this layer be restricted in thickness. This but stresses the importance of tenaciously uniting the peripheral layer of abrasive material with the support or core on which it is mounted, so as to avoid disintegration of the peripheral layer, particularly when the last remaining portions are in use.

In accordance with this invention, the core or support is preformed either in another mold or in the same mold in which the abrasive article is to be formed. In the latter case, a temporary confining wall of smaller diameter than the diameter of the finished article is employed for initially forming the core or support.

With the core or support in place in the mold, a mixture of abrasive grain and bond is distributed in the space between the periphery of the core or support and the mold walls. Pressure is then applied axially to compress both the core or support and the surrounding mixture, thereby uniting them as an integral abrasive article. The amount of abrasive mixture introduced is carefully predetermined to yield a peripheral layer of the desired thickness. If an excess of the abrasive mixture is introduced, it tends to cause distortion of the periphery of the core or support during the subsequent pressing of the complete article; and the same is true if there is a deficiency of the abrasive mixture.

As a modification of this process, when it is desired to provide in the finished article an intermediate layer of abrasive mixture between the support and the operative face layer, the same procedure is followed so far as preforming the core or support is concerned, but bonded abrasive is introduced to form two concentric bands or layers surrounding the core or support within the confining mold. In other words, a preformed core or support is provided in a mold, as before. Thereafter a mixture of abrasive grain and bond is distributed as an annulus surrounding the core but in spaced relation to the walls of the mold. After consolidating this intermediate annulus, a mixture of abrasive grain and a similar bond is distributed in the remaining space just within the mold walls, thereby surrounding the first annulus with an outer annulus. Pressure is thereafter applied axially to compress both the support and the surrounding annuli, whereby the parts of the abrasive article are united.

This improved method and apparatus are illustrated in the accompanying drawing in which.

Figure 1:
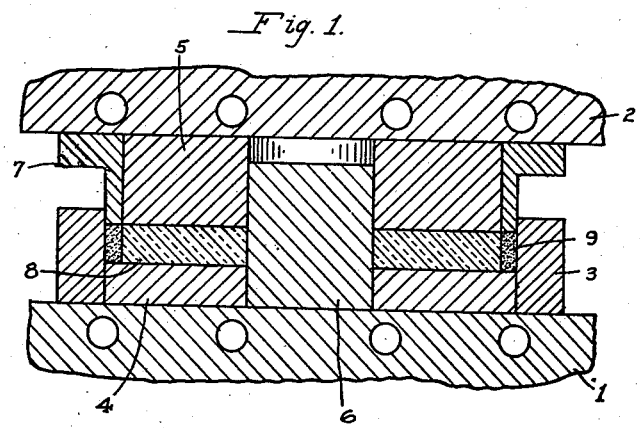
Figure 1 is a vertical sectional view of apparatus for performing the simpler process which results in the making of a composite article having but a single layer or tire of abrasive on its periphery, the section being taken along the axis of the mold.
Figure 2:
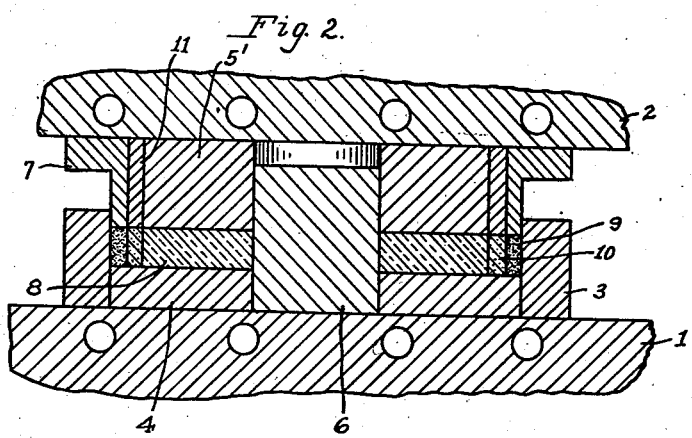
Figure 2 is a similar sectional view of apparatus for molding a composite abrasive article of the second type having an outer layer and an intermediate layer of bonded abrasive.

In making a composite abrasive article of the simpler type in which a peripheral layer or tire is molded directly on a preformed core or support, apparatus such as shown in Figure 1 may be employed. The usual lower and upper press platens are indicated at 1 and 2, respectively. As is customary, passageways are provided in the platens for the circulation of heating medium and cooling medium. On the platen 1 is supported a mold barrel 3 having a bottom closure. If an imperforate disk is to be formed, this bottom closure is made in the form of a disk. Where a wheel with an arbor opening is to be formed, a bottom closure in the shape of an annulus 4 (as shown in Figs. 1 and 2) is employed. A plunger 5, similar in contour to the bottom closure, but of less outer diameter, cooperates with the mold. Where, as is shown in Figure 1, a wheel with an arbor opening is to be formed, the plunger 5 is shaped as a ring plunger having a central opening to receive an arbor pin 6, which is mounted within the bottom closure 4 on the bottom platen 1. A ring plunger 7 is slidable upon the outer surface of the plunger 5 so as to enter the mold space within the walls of the barrel mold 3. Provision is made, as usual, for causing relative movement between the platens 1 and 2 toward and from each other to perform the pressing operations.

The core or support 8 may be formed in its own mold, and then placed within the mold 3; or it may be formed by means of the apparatus shown in Figure 1 as a preliminary step. In the latter case, the ring plunger 7 is lowered so as to rest on the bottom closure 4, the plunger 5 being removed at this time to afford access to the mold space within the plunger 7. Material for forming the core or support 8 is then introduced within the ring plunger 7, the amount of material introduced being accurately predetermined in accordance with the thickness (i. e., dimension from one lateral face to the other) of the finished abrasive article. The plunger 5 is then introduced within the ring plunger 7, and the core or support 8 is given a preliminary pressing. Compression is not carried to completion at this time, because it is desired to later compress the core 8 to finished dimensions when finishing the composite article. If the final compression is to be effected at 2000 pounds per square inch and at a temperature of 350° F., the core 8 is preformed at 500 pounds per square inch and 350° F.

When the core or support 8 is formed with the apparatus shown in Figures 1 and 2, there is a tendency for the core to adhere or seal to the bottom closure 4 and to the plunger 5. It is helpful to take advantage of this adhesion in the succeeding steps of the process. In fact, if due to the newness of the mold parts the core 8 fails to adhere to the extremely smooth walls of these parts, it is advisable to place a minute portion of adhesive material such as powdered synthetic resin of the phenol-formaldehyde type at one or more points on the upper surface of the bottom closure 4 in order to insure such sealing.

The advantage of such sealing lies in the fact that it prevents infiltration of the abrasive mix beneath the core or support 8 during the subsequent molding operation. In other words, if the core 8 rested loosely on the bottom closure 4, the pressure created during the subsequent pressing operation would tend to cause some of the abrasive mix from the surrounding annulus to flow in underneath the preformed core and between the same and the bottom closure 4.

With the core 8 mounted on the bottom closure 4 (and the arbor pin in position, if such is used) the plunger 5 is slipped into place on top of the core 8. Into the peripheral space between the mold 3 and the core 8 the abrasive mix which is to form the outer layer or tire 9 of the wheel is then introduced. This space extends down to the bottom closure 4, and is bounded on the outside by the inner wall of the mold 3, and on the inside by the peripheral wall of the preformed core or support 8.

The amount of abrasive mixture introduced is carefully calculated to form an outer layer or tire of the proper dimensions. If too much abrasive mixture is introduced, the periphery of the preformed core 8 will be distorted in the consolidated article. The same is true if too little abrasive mixture is introduced, as the peripheral wall of the core 8 will become bowed outwardly when the composite article is consolidated.

After the abrasive mix has been distributed evenly within the peripheral space by means of tampers, the ring plunger 7 is slid down over the plunger 5, the plungers 5 and 7 being of the same height, and the press is operated to consolidate and harden the article. This final pressing occurs in two stages. First, the platen 2 presses on the ring plunger 7, and the abrasive mix is gradually consolidated under the influence of heat and pressure until platen 2 engages likewise the ring plunger 5. Second, the plungers 7 and 5 press simultaneously upon the entire mold contents until the ultimate degree of consolidation desired has been attained. The vertical distance through which this second step is carried may be 25% or more of the thickness of the finished article.

It is preferable to use a synthetic resin both for the core or support 8 and as the bond of the outer layer or tire 9 although it is not necessary to use the identical resin for the two. The abrasive article tends to crack and may go to pieces in use if there is too great a difference in the coefficient of thermal expansion between the core or support 8 and the outer layer 9. This difficulty is largely overcome if similar material is used both for the core 8 and the bond of the outer layer 9. Among the synthetic resins, some are reversible (i. e., they are not rendered permanently rigid by curing with heat but are capable of being rendered again plastic by heat) and others are non-reversible (i. e., permanently rigid by curing with heat). Either type may be used. Of the non-reversible, or heat-hardenable type, a phenol-formaldehyde condensation product resin such as is sold under the trade-mark "Bakelite" is found to be particularly well suited for use as the binder in the outer layer. Such a resin becomes set when molded under heat and pressure. A pressure of 2000 pounds per square inch when using steam at 150 pounds pressure for heating the platens has been found to give suitable results.

With regard to the core 8, excellent results are obtained if the material for the same comprises a reversible resin as a bond. It is not necessary, however, to use a reversible resin for this purpose, and if the synthetic resin is irreversible, we use it in the form of a molding compound to prevent excessive flow during the preforming operation. A typical formula is as follows:

|  | Percent by weight |
|---|---|
| Reactive phenol-formaldehyde resin | 30 |
| Powdered graphite | 40 |
| Powdered flint | 30 |

On the other hand, if the synthetic resin is reversible, it may be charged into the mold in granular form, say 16 mesh and finer, without the admixture of inert fillers. This type of resin may also be blended with a filler; one which functions well being a mixture of a reversible resin of the modified vinyl resin type sold under the trade-mark "Alvar" 100 pts. by weight, and wood meal 70 pts. by weight.

In the pressing operation, the preformed core 8, which was purposely left oversize when given its preliminary shape, and the outer layer or tire of abrasive mixture definitely flow together. Under the influence of the heat and pressure, the core and the outer layer or tire of abrasive material are strongly knit together. On the other hand, if the proper amount of abrasive mixture has been used, there is no substantial distortion of the periphery of the preformed core or support 8 from parallelism with the inner walls of the mold 3. The term parallelism is used in this connection because in the great majority of cases such a straight juncture will be desired, but it is of course possible by varying the quantity of abrasive mixture introduced to produce concave or convex junctures if the articles are to be used for special purposes.

Obviously the compressibility of the mix determines the volume of the mix which should be inserted. For a wheel ½" in thickness with an arbor hole 1¼" in diameter and an overall diameter of 7", the following table has been worked out when using for the core or support a mixture of wood flour bonded by a reversible resin sold under the trade-mark "Alvar". This mixture alone was used for the support or core 8, and a mixture of phenol-formaldehyde condensation product resins made by mixing equal parts of "Bakelite" resins Nos. BR 2417 and BR 2428, and a filler combined with diamond granules was used for the outer layer or tire 9. Three sizes of the outer layer or tire are given in successive columns, these sizes indicating the radial thickness of the tire:

| Tire size | 1/16" | 3/32" | 1/8" |
|---|---|---|---|
| Weight of core in grams | 365 | 355 | 345 |
| Weight of abrasive mixture in grams | 20.97 | 30.74 | 40.37 |
| Final thickness | 1/2" | 1/2" | 1/2" |

(The initial pressing of the core 8 resulted in thicknesses varying from 5/8" to 3/4", depending upon the amount of material used and the amount of pressure.)

The following table illustrates the effect of the amount of material used for forming the outer layer or tire of abrasive material in giving uniform dimensions to the outer layer or tire:

| Tire size | 3/32" | 3/32" | 3/32" |
|---|---|---|---|
| Weight of core in grams | 355 | 355 | 355 |
| Weight of abrasive mixture in grams | 40 | 30 | 20 |
| Shape of juncture | concave | straight | convex |

In some cases, particularly where the outer layer or tire 9 comprises diamond granules, it is desirable to interpose an additional layer 10 of bonded abrasive between the outer layer or tire and the preformed core or support 8. In this case, the core 8 is formed as before, either in a separate mold or with the apparatus shown in Figure 2. This apparatus differs from the apparatus shown in Figure 1 in that an additional ring plunger 11 for compacting the interposed layer of mix is slidable on the inner plunger 5 and between the same and the ring plunger 7.

In using this apparatus to preform the core or support 8, the ring plungers 7 and 11 are lowered so as to rest upon the bottom closure 4, the plunger 5' being removed at this time so as to leave the mold space free within the plunger 11. Material for forming the core or support 8 is then introduced within the ring plunger 11, the amount of material introduced being accurately predetermined, as before. The plunger 5' is then introduced within the ring plunger 11 and the core or support 8 is given a preliminary pressing. The pressure is limited, as before, so as not to consolidate the core 8 to its final thickness.

The platens 1 and 2 are now separated, the ring plungers stripped from the preformed core 8, and the plunger 5' loosened from the top of the core or support 8. The ring plunger 7 is then replaced, so as to rest on the bottom closure 4. The plunger 5' is telescoped with the arbor pin 6, there being left a smaller annular recess or space between the ring plunger 7 and the plunger 5' and core 8. The mixture of abrasive and bond, the bond being preferably the same as that which is to be used for the abrasive mixture forming the outer layer or tire 9, is then tamped into this space or cavity, the mix being evenly distributed about the periphery of the core 8. The amount of mix introduced is accurately predetermined in accordance with the dimensions of this intermediate layer. The ring plunger 11 is then placed in position, sliding on the outer surface of the plunger 5', and pressure equal to the pressure used in preforming the core 8 is applied, together with heat, for a sufficient period to set the intermediate layer 10 just enough to hold its shape. Cooling fluid is then introduced into the platens to cool down the molded article. The curing of the intermediate layer 10 is thus halted so as not to prevent its flowing in subsequent operations. The molded article is then stripped from the ring plunger 7, leaving the preformed core 8 and intermediate layer 10 still adhering or sealed to the bottom closure 4, plunger 5' and ring plunger 11.

After the stripping operation just mentioned, the mold barrel 3 is replaced on the bottom closure 4 as shown in Figure 2, and the ring plunger 11 resting on top of the intermediate layer 10, the abrasive mix which is to form the outer layer 9 is tamped into the space left between the layer 10 and the inner walls of the mold 3. The plunger 7 is then placed in position and the entire article is compressed and united in the manner set forth in detail in the description of the first embodiment of the process.

As pointed out in connection with a copending application Serial No. 12,579 covering the product, filed Mar. 23, 1935, it is also practical to make a wheel of the type shown in Figure 2 by preforming both the core 8 and the abrasive layer or tire 9. This may be accomplished in individual molds and the two preformed parts assembled in a mold such as shown in Figure 2. The plunger 5' is placed on top of the core 8 and the ring plunger 7 is placed on top of the tire 9. Into the cavity remaining between the outer layer or tire 9 and the core 8 is then introduced the mixture intended to form this intermediate layer. The ring plunger 11 being inserted in operative position, with the plunger 5' within the same and the ring plunger 7 surrounding the same, the platens may then be operated to preliminarily compact or press the intermediate layer 10 and then to compress and unite the composite article.

This is accomplished in two stages, just as with the embodiment described in connection with Figure 1; viz. the intermediate layer is gradually consolidated until the platen engages likewise the plungers 5' and 7, after which the second stage of the compression is accomplished. In this second stage, the compression may be one-fourth or more (based on the finished article).

This improved process and apparatus for making composite abrasive articles affords several advantages in the making of such articles. Noteworthy among these advantages is the integral character of the resulting product, since during the final compression of the article the oversized core and the abrasive layer or layers are caused to flow, filling up voids and causing the core and surrounding layers to unite and knit together cohesively. Moreover by the methods described it is possible to control the juncture between the parts thus united, so that there is substantially no distortion. This is of importance in the finished product, since it makes it possible to make sure that the juncture is parallel to the axis of the abrasive article.

Moreover the article produced by the final compression is a finished article which does not require any substantial amount of trimming, and the outer surfaces of the article as sold may conform closely to the shape of the mold cavity.

We claim:

1. The method of making a composite abrasive article having an outer layer of very hard abrasive grain bonded with a heat hardened synthetic resin and supported on an inner layer containing abrasive grain of a less degree of hardness similarly bonded, which method comprises forming a cylindrical core from a heat hardenable synthetic resin and an inert filler with light pressure to give the core a preliminary shape, forming an inner abrasive layer on the periphery of the core with a similarly light pressure exerted at the curing temperature of the bond to give the latter a preliminary set, cooling the core and its surrounding layer to interrupt the setting of the bond, forming an outer abrasive layer on the periphery of the layer previously formed, and pressing the composite abrasive article and core at pressures greatly exceeding the preliminary pressures mentioned above and at the curing temperature of the bond to strongly unite the composite article.

2. The method of making a composite abrasive article having an outer layer of very hard abrasive grain bonded with heat hardened synthetic resin and supported on an inner layer containing abrasive grain of a less degree of hardness similarly bonded, which method comprises forming a cylindrical core from a heat hardenable synthetic resin and an inert filler to give said core a preliminary shape, forming under similar pressure conditions an annulus of approximately the same axial extensions as the core but having an inner diameter greater than the outer diameter of the core so that the said annulus can be positioned coaxially with respect to the core and spaced therefrom, forming between the core and outer abrasive annulus a second abrasive annulus containing abrasive of a less degree of hardness and a heat hardenable synthetic resin, and pressing the core and the two surrounding annuli at pressures greatly exceeding the pressures previously used in forming the core and abrasive layers and at the curing temperature of the bond for a sufficient time to strongly unite the core and the two abrasive layers into a unitary article.

3. In the method of molding composite abrasive wheels the steps which comprise placing a partially preformed cylindrical support for abrasive material coaxially within a mold barrel of greater internal diameter, said support having been partially consolidated under light pressure and at temperatures exceeding 300° Fahrenheit, distributing a mixture of abrasive grain and a heat-hardenable resinous bond as an annulus closely surrounding the support but in spaced relation to the interior wall of the mold, partially consolidating the annulus, distributing in the remaining space between the annulus and the wall of the mold a mixture of another variety of abrasive grain and a heat-hardenable resinous bond, and applying pressure to the interior of the mold substantially higher than the pressure used in forming the support, said higher pressure being used to compress both the support and the two surrounding annuli and thereby uniting the parts of the abrasive article.

4. In the method of molding composite abrasive articles, the steps which comprise partially preforming a support containing heat-hardenable resin, said support having been partially consolidated under light pressure and at temperatures exceeding 300° Fahrenheit, surrounding the support with an outer annulus of abrasive mix comprising diamond particles and heat-hardenable resin and an intermediate annulus of abrasive mix comprising abrasive particles of less hardness than diamond and heat-hardenable resin, confining the outer annulus peripherally, and then applying pressure to the support and to the two surrounding annuli substantially higher than the pressure used in forming the support, said higher pressure being used to compress both the support and the surrounding annuli to a unitary article.

ALBERT L. BALL.
ARTHUR G. SCUTT.